US006965079B2

(12) United States Patent
Westberry

(10) Patent No.: US 6,965,079 B2
(45) Date of Patent: Nov. 15, 2005

(54) ELECTRICAL GROUND CONNECTION APPARATUS

(76) Inventor: Wyman Westberry, 911 Dilworth St., St. Mary's, GA (US) 31558

( * ) Notice: Subject to any disclaimer, the term of this patent is extended or adjusted under 35 U.S.C. 154(b) by 0 days.

(21) Appl. No.: 10/761,727

(22) Filed: Jan. 21, 2004

(65) Prior Publication Data

US 2005/0155782 A1 Jul. 21, 2005

(51) Int. Cl.[7] .......................... H02G 3/18; H01R 4/66

(52) U.S. Cl. .......................... 174/65 R; 174/2; 174/3; 174/5 G; 361/799

(58) Field of Search .......................... 174/65 R, 2, 3, 174/5 R, 5 SG, 6, 7, 51, 78, 68.1, 126.1; 361/215, 799, 212; 285/149.1, 238, 150.1; 248/511, 49

(56) References Cited

U.S. PATENT DOCUMENTS 4,577,053 A * 3/1986 Kies .......................... 174/7
4,993,960 A * 2/1991 Franks, Jr. .......................... 174/6
5,460,532 A * 10/1995 Leto .......................... 285/404
5,663,525 A * 9/1997 Newman .......................... 174/50
6,307,149 B1 * 10/2001 Zini et al. .......................... 174/3
6,727,430 B1 * 4/2004 Franks, Jr. .......................... 174/51
6,774,305 B2 * 8/2004 Wellman et al. .......................... 174/51

* cited by examiner

*Primary Examiner*—Angel R. Estrada
(74) *Attorney, Agent, or Firm*—Merchant & Gould

(57) ABSTRACT

Apparatus for providing an electrical ground connection through a pipe or conduit system including electrically non-conductive portions. A pipe fitting, preferably although not necessarily made of electrically non-conductive material, is equipped with an electrically conductive member extending within the fitting for intimate contact with a fluid carried by the fitting. A portion of the conductive element extends outside the pipe fitting, for connection to a suitable electrical ground. The conductive element within the fitting thus is at electrical ground potential, and that ground potential is transferred through an electrically conductive fluid medium within the pipe system to any electrically conductive element of the pipe system.

13 Claims, 1 Drawing Sheet

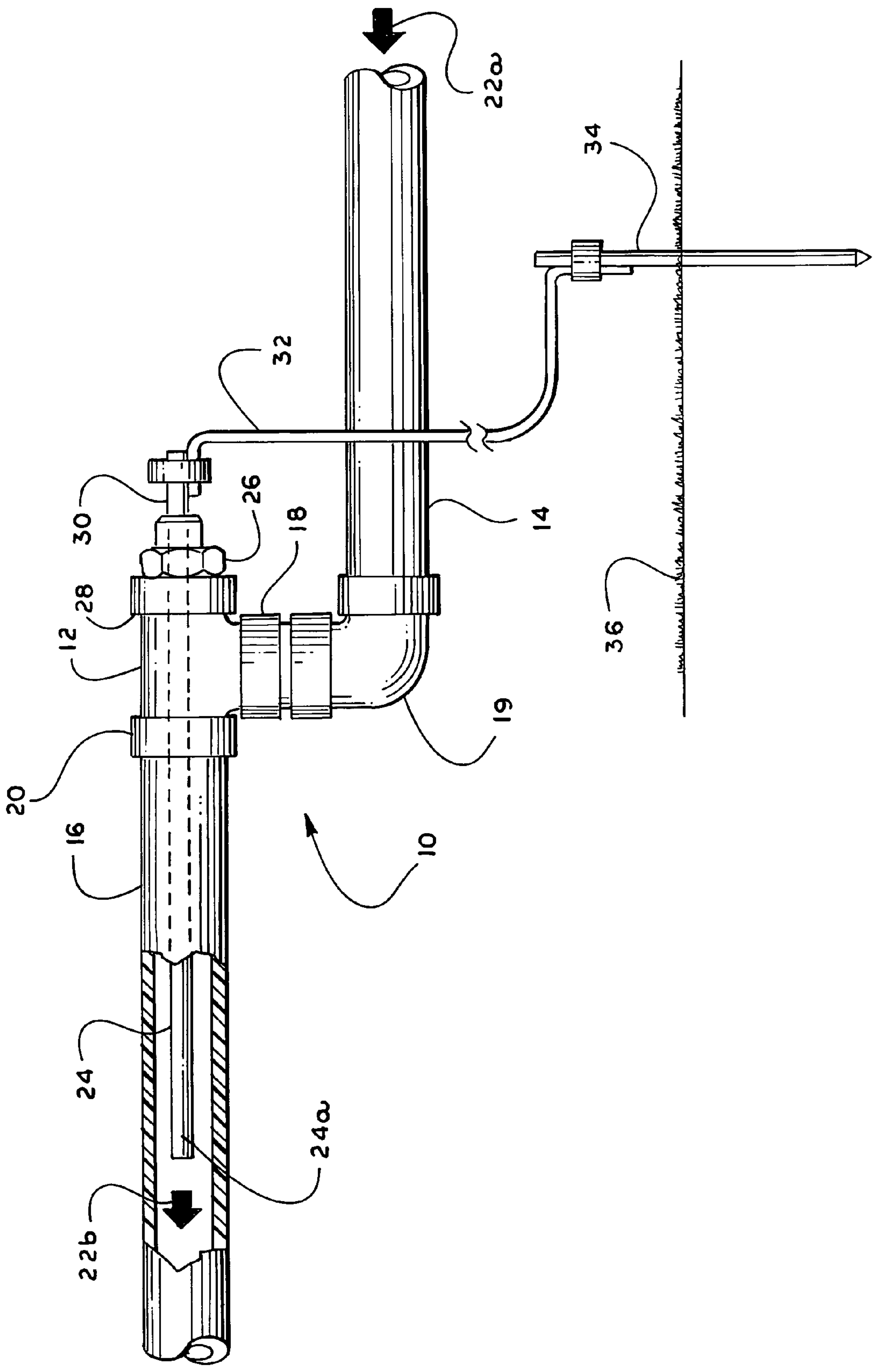
22a
34
32
30
26
18
14
28
12
36
19
20
16
10
24
24a
22b

ELECTRICAL GROUND CONNECTION APPARATUS

FIELD OF THE INVENTION

The present invention relates in general to electrical grounding connections, and relates in particular to apparatus for establishing an electrical ground connection through plumbing or piping systems that may include electrically nonconductive pipe or other components.

BACKGROUND OF THE INVENTION

It is important in many applications to establish a dependable electrical ground connection. Grounding requirements may necessitate that particular electrical equipment, or one side of an electrical circuit, be maintained at zero potential difference with respect to absolute ground potential, namely, the earth. For example, one side of a typical single-phase electrical distribution circuit typically is maintained at ground potential. One simple way to provide an earth ground connection is to drive a metal stake or grounding rod into the earth and extend a wire or other suitable conductor from that grounding rod to the apparatus or circuit to be maintained at ground potential.

The use of alternatives to an electrical grounding rod soon evolved for establishing or maintaining electrical grounding in practical applications. These alternatives typically included utility lines, such as water pipes, buried in the earth. Such utility pipes typically utilized electrically-conductive metals such as iron or copper pipe, and are in intimate contact with the earth before entering a building. Accordingly, a suitable grounding connection could be made to a water pipe, for example, within a particular structure, with knowledge that the ground connection thus made would be at earth ground potential extending along the electrically-conductive pipe system to a point where the pipe entered into contact with the earth.

In more recent times however, pipes or conduits made of electrical non-conductors such as PVC have been substituted for copper or iron pipe and other plumbing fittings, as such non-metallic pipe and fittings are less expensive to manufacture and install into a plumbing system and are not subject to corrosion, i.e., when buried in the earth. PVC pipe is especially in widespread use for cold-water lines that otherwise would provide a direct path to earth. Moreover, water lines extending from dwellings to an upstream water main, and indeed the water mains themselves, increasingly are made of PVC or another non-metallic material. A conventional plumbing system having even a single portion of non-metallic material cannot provide a ground connection, when a person connects a ground wire to a metallic plumbing component downstream in the plumbing system from the non-metallic element. As a result, the risk exists that someone may believe an electrical component or circuit is at ground after making a connection to a metallic plumbing element, such as a localized metal pipe or faucet within the plumbing system, when in fact the presence of an intervening non-conductive pipe or other plumbing element prevents electrically-conductive path extending from that element to an earth ground.

Fuel delivery systems are another application where proper grounding is essential to reduce the risk of fire or explosion. Fuel supply pipes leading to fuel delivery pumps from underground fuel storage tanks, as well as the tanks themselves, increasingly are made of nonmetallic material that does not provide a ground path from the pump to earth.

If a vehicle operator acquires a static-electricity charge, e.g., sliding across certain kinds of seat upholstery when exiting the vehicle at a fueling station, that static charge may transfer to the metallic fuel delivery nozzle of a gasoline pump. The static charge on the nozzle may cause a spark to jump from the nozzle to the fuel filler pipe of the vehicle as the nozzle is moved into contact with the fuel filler pipe. If a sufficient concentration of gasoline vapor is present at the entrance to the filler pipe, that spark can ignite a fire.

BRIEF SUMMARY OF THE INVENTION

Stated in general terms, apparatus according to the present invention provides a connection to electrical ground by establishing a conductive path through an electrically conductive fluid within a conduit such as a pipe or pipe system. That electrically-conductive path comprises a conducting element within an element of the pipe or pipe system and extending outside the pipe element for connection to a suitable electrical ground source, thereby placing the electrically conductive fluid at ground potential. An electrically conductive plumbing or pipe element exposed to the grounded fluid within the pipe system thus becoming effectively at electrical ground potential and may function as a contact point for grounding desired equipment.

Stated in somewhat greater detail, apparatus according to the present invention includes a pipe element having an interior region for receiving fluid flow. An electrically conductive element is disposed at the interior region of the pipe element for exposure to a fluid within that region, and that conductive element extends or is connected to a point outside the pipe element. If the pipe element is made of an electrically non-conductive material, a conductive path is nevertheless provided between the electrically conductive element and the point outside the pipe element. The electrically-conductive path appearing on the exterior of the pipe element may be connected to any suitable electrical ground, including but not limited to a conventional grounding rod at earth potential, thereby establishing the electrically conductive element within the pipe element at ground potential, which in turn maintains a conductive fluid within the pipe system at that same electrical potential.

Stated in further greater detail, the conductive element within the interior region of the pipe element or fitting may take the form of a metallic rod extending within the interior of the pipe element for exposure to a conductive fluid therein. In one embodiment of the present invention, the metallic rod extends to the exterior of the pipe element for making suitable connection to a grounding rod or other source of earth potential as appropriate.

Accordingly, it is an object of the present invention to provide improved apparatus for establishing an electrical ground connection.

It is another object of the present invention to provide apparatus for establishing an electrical ground connection through a pipe or conduit system composed at least in part of electrically non-conductive components.

Other objects and advantages of the present invention will become more apparent from the following description of a preferred embodiment.

BRIEF DESCRIPTION OF THE DRAWING FIGURE

The FIGURE shows an electrical ground connection apparatus, partially sectioned for illustrative purposes, according to a disclosed embodiment of the present invention.

DETAILED DESCRIPTION OF PREFERRED EMBODIMENT

Ground connection apparatus according to the disclosed embodiment of the present invention is shown generally at 10 in the FIGURE and includes a pipe element or fitting 12 installed in a plumbing system including an inlet pipe 14 and an outlet pipe 16. The pipe fitting 12 itself, in the disclosed embodiment, is a modified tee having a lateral port 18 to which the inlet pipe 14 is connected, and having a second port 20 to which the outlet pipe 16 is connected through a conventional 90-degree bend 19. The arrows 22*a* and 22*b* show the direction of fluid flowing into the inlet pipe 14, the fitting 12, and exiting the outlet pipe 16, although it should be understood that the direction of fluid flow is not relevant to the present invention. In the disclosed embodiment, the outlet pipe 16, the fitting 12, and the inlet pipe 14 are made of a plastic material such as PVC or the like suitable for domestic plumbing installation, although it should be understood that the selection of a particular non-metallic material is a matter of choice and is not a requirement of the present invention.

An electrical transfer rod 24 is mounted in the pipe element 12 for establishing a ground path connection with a conductive fluid flowing or otherwise disposed within a piping system including the fitting. The transfer rod 12 in the disclosed embodiment is affixed to an adaptor fitting 26 securely mounted in the third port 28 of the pipe fitting 12 at the longitudinal end of that fitting opposite the second port 20. The transfer rod 24 thus is in longitudinal alignment with the ports 20 and 28, and one end 24*a* of the transfer rod extends a distance beyond the port 20 so as to extend a distance into the outlet pipe 16. The length of the rod 24 thus extending into the pipe 16 is not considered critical, although it will be understood that the circumferential area of the transfer rod provides the ground pathway between that rod and the fluid within the pipe.

The transfer rod 24 is a relatively good electrical conductor and preferably is made of a suitable metal such as copper, aluminum, or other metal having good electrical conductivity and resistance to corrosion or other adverse affects arising from contact with fluids within the pipe system. A transfer rod 24 of iron or steel thus will suffice, if coated or composed to resist rusting, although it will be understood that any such coating should not significantly reduce the electrical conductivity between the transfer rod and a fluid medium surrounding that rod.

The electrical transfer rod 24 requires some means for establishing electrical connection with a grounding source external to the apparatus 10. In the disclosed embodiment, this connection is provided by a relatively short end 30 of the transfer rod extending outwardly from the adaptor fitting 26 at the third port 28 of the pipe fitting 12. The end 30 of the transfer rod 24 provides a contact point by which a ground wire 32 may be connected, extending to any suitable earth ground schematically represented by the grounding rod 34 penetrating the earth 36. It will, of course, be understood that the ground connection represented by the ground wire 32 and grounding rod 34 may alternatively be provided by any suitable connection extending to earth ground potential or the like.

Operation of the disclosed embodiment should now be apparent from the foregoing description. As an electrically conductive fluid occupies the region within a piping system containing the apparatus 10 including the fitting 12 and transfer rod 24, the conductive fluid is in intimate contact with the transfer rod. An electrical grounding connection thus is established between that conductive fluid and ground potential, by way of the ground wire 32 extending between the end 30 of the transfer rod and the grounding rod 34. This electrical ground potential of the electrically conductive fluid within the pipe thus is transferred throughout that fluid, so that any electrically conductive element such as a faucet or metallic pipe section exposed to that fluid becomes substantially at ground potential despite the existence of non-conductive piping such as the pipe 16 between that fitting and the grounding apparatus 10. Alternatively, if no metallic faucet or other element of the piping system exists at a location where a ground connection is required, another grounding apparatus 10 may be inserted into the pipe system at that location, so that the equipment may be grounded by suitable attachment to the end 30 of a transfer rod in that other grounding apparatus.

It should be understood that the use of a tee pipe element 12 adapted to receive the electrical transfer rod 24 extending through the adaptor fitting 26, as described herein in the disclosed embodiment, is but one way of implementing the present invention. For example, a special-purpose pipe element could be provided with an electrical transfer rod or other internal conductor pre-installed, so as to do away with the need for a separate adaptor fitting 26 for installing the transfer rod through a conventional tee connection. Moreover, the electrical transfer rod can be pre-installed in a pipe fitting that includes a length of outlet pipe 26 co-extensive with the end 24*a* extending outwardly from the fitting 12 in the disclosed embodiment. The outermost end of that pipe extension would terminate in a suitable port or opening for attachment to an adjoining element of the pipe system.

The foregoing relates only to a preferred embodiment of the present invention, and numerous changes and modifications therein may be made without departing from the spirit and scope of the present invention as defined in the following claims.

What is claimed is:

1. Apparatus for establishing an electrical ground connection, comprising:

an electrically nonconductive pipe having an interior region adapted for connection in fluid flow relation to a plumbing system;

an electrically conductive element disposed at the interior region of the pipe for exposure to a fluid within the pipe; and means disposed outside the pipe and operative to provide an electrically conductive path between the conductive element and an electrical ground source external to the pipe, whereby an electrical ground path is established with fluid in the interior region of the pipe.

2. Apparatus as in claim 1, wherein the conductive element is spaced apart from an inner wall defining the interior region of the pipe.

3. Apparatus for establishing an electrical ground connection, comprising:

a substantially electrically nonconductive pipe having an interior region for accommodating fluid flow;

an electrically conductive element disposed at the interior region of the pipe for exposure to a fluid therewithin and spaced apart from an inner wall defining the interior region of the pipe;

means disposed outside the pipe and operative to provide an electrically conductive path between the conductive element and an electrical ground source external to the pipe, whereby an electrical ground path is established with fluid in the interior region of the pipe; and wherein the conductive element comprises a metallic rod extending within the interior region.

4. Apparatus as in claim 3, wherein an end of the rod extends external to the pipe, for operative association with the means.

5. A plumbing fitting for establishing an electrical ground connection to a plumbing system including at least one nonmetallic component, the plumbing fitting comprising:

a plumbing element adapted for connection in fluid flow relation to the plumbing system;

an electrical conductor associated with the plumbing element for contact with fluid therein, so as to establish an electrically conductive path between the conductor and the fluid; and the electrical conductor extends outside the plumbing element for connecting to an electrical ground source so as to establish an electrical ground path between the electrical ground source and an electrically conductive fluid within the plumbing element, whereby the electrical ground path extends to an electrically conductive element despite a nonconductive element in the plumbing element and the plumbing system intermediate the electrically conductive plumbing fitting.

6. The plumbing fitting as in claim 5 wherein the plumbing element is substantially electrically nonconductive.

7. The plumbing fitting as in claim 5, wherein:

the plumbing element has plural ports for connecting to the plumbing system; and the electrical conductor comprises a rod extending into the plumbing element for contact with fluid entering through the ports.

8. The plumbing fitting as in claim 7, wherein the rod has a free end extending a distance out of one port, so that the rod can extend into a conduit connected to the one port for contact with fluid in the conduit.

9. The plumbing fitting as in claim 7, wherein the rod is substantially coaxial with one such port and extends a distance out of the one port, so that a portion of the rod extends into a conduit connected to the one port for contacting a fluid in the conduit.

10. The plumbing fitting as in claim 9, wherein the plumbing element is made of substantially electrically nonconductive material.

11. Apparatus for establishing an electrical ground connection through a pipe system that may include at least one electrically nonconductive element, the apparatus comprising:

an electrically nonconductive pipe element operative for accommodating fluid flow through a pipe system including the pipe element; and an electrically conductive element disposed within the pipe element for exposure to a fluid within the pipe element, and extending outside the pipe element for connection to an electrical ground source, whereby an electrical ground path is established between the ground source and the electrically conductive element in contact with fluid in the nonconductive pipe element.

12. A method for establishing an electrical ground connection through a pipe system for accommodating electrically conductive fluid, comprising the step of:

disposing an electrical conductor within an electrically nonconductive pipe element adapted for connection in fluid flow operation in the pipe system; and providing a conductive path that extends from the electrical conductor within the pipe element to a connection point outside the pipe element, for attachment to an electrical ground.

13. The method as in claim 12, comprising the further step of installing, into a fluid-flow piping system having at least one electrically non-conductive component, an apparatus prepared according to said claim, and attaching the connection point to an electrical ground.

* * * * *